US010237080B2

(12) United States Patent
Wu et al.

(10) Patent No.: US 10,237,080 B2
(45) Date of Patent: Mar. 19, 2019

(54) TRACKING DATA USAGE IN A SECURE SESSION

(71) Applicant: Verizon Patent and Licensing Inc., Arlington, VA (US)

(72) Inventors: Shuai Wu, Wellesley, MA (US); Fengping Zhang, Burlington, MA (US); Susan Kelly, Maynard, MA (US); Hector Saint-Hilaire, Waltham, MA (US); Dahai Ren, Lincoln, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 286 days.

(21) Appl. No.: 14/962,184

(22) Filed: Dec. 8, 2015

(65) Prior Publication Data

US 2017/0163430 A1 Jun. 8, 2017

(51) Int. Cl.
*H04L 12/14* (2006.01)

(52) U.S. Cl.
CPC .................. *H04L 12/1403* (2013.01)

(58) Field of Classification Search
None
See application file for complete search history.

(56) References Cited

U.S. PATENT DOCUMENTS

| 2004/0098609 | A1* | 5/2004 | Bracewell | H04L 63/068 726/6 |
| 2012/0129447 | A1* | 5/2012 | Nitta | H04W 4/18 455/9 |
| 2012/0155380 | A1* | 6/2012 | Hodges | G06Q 30/00 370/328 |
| 2013/0305040 | A1* | 11/2013 | Lee | H04L 9/083 713/155 |
| 2014/0195641 | A1* | 7/2014 | Wang | H04L 67/327 709/217 |
| 2015/0118991 | A1* | 4/2015 | Chung | G06Q 20/123 455/406 |
| 2015/0189097 | A1* | 7/2015 | Sharma | H04M 15/65 370/259 |
| 2015/0242903 | A1* | 8/2015 | Peebles | G06Q 30/0267 705/14.64 |
| 2015/0281408 | A1* | 10/2015 | Kwan | H04L 69/22 370/474 |
| 2016/0164680 | A1* | 6/2016 | Liao | H04W 12/04 713/155 |

* cited by examiner

*Primary Examiner* — George C Atkins

(57) ABSTRACT

A first device may obtain a session time record that includes information relating to a secure session. The session time record may include a content identifier and a device identifier that is associated with a second device. The content identifier may be associated with content to be provided via a secure session and via the second device. The content may be associated with a sponsored data campaign. The first device may obtain, from the second device, data usage information identifying an amount of data provided via the second device and in association with the secure session. The first device may determine information identifying a party responsible for the amount of data provided in association with the secure session based on the session time record and based on the data usage information. The first device may store or provide the information identifying the party responsible for the amount of data.

20 Claims, 9 Drawing Sheets

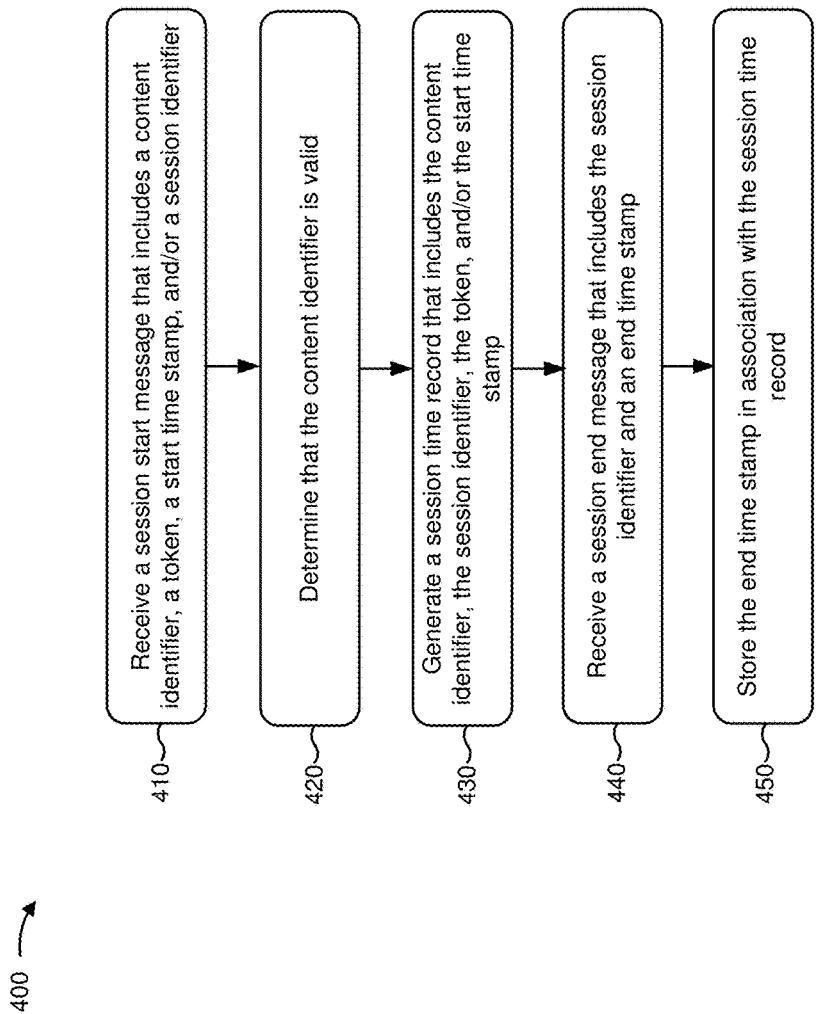

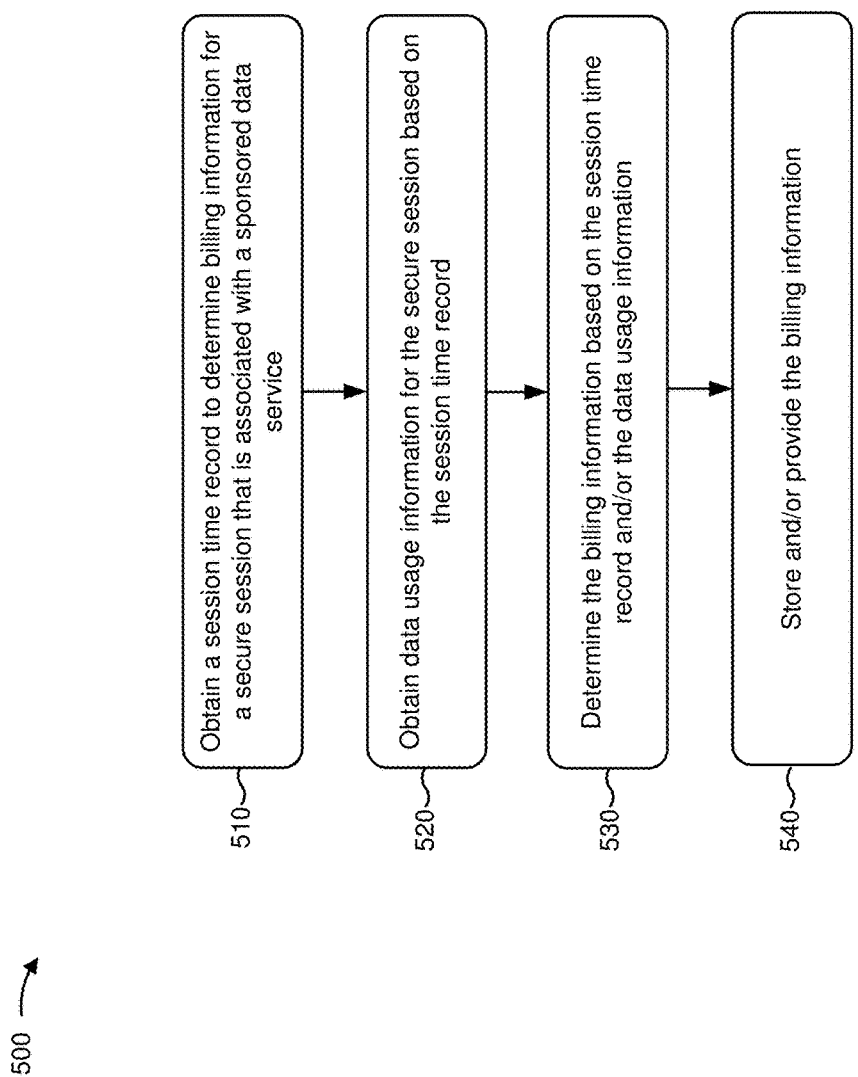

TRACKING DATA USAGE IN A SECURE SESSION

BACKGROUND

Content providers, such as online media companies, may wish to deliver content to network users. Some content providers may choose to subsidize the cost of network data usage which would otherwise be paid by the network users accessing the content.

BRIEF DESCRIPTION OF THE DRAWINGS

FIG. 4 is a flow chart of an example process for generating a session time record relating to a secure session; and FIG. 5 is a flow chart of an example process for determining billing information based on a session time record.

DETAILED DESCRIPTION OF PREFERRED EMBODIMENTS

The following detailed description of example implementations refers to the accompanying drawings. The same reference numbers in different drawings may identify the same or similar elements.

A content provider may want to provide content to a network user. The content provider may want to subsidize the cost of network data usage which would ordinarily be charged to the network user to access the content. A network operator may selectively bill the content provider or the network user based on the content that is accessed, based on data usage while accessing the content, based on a result of authenticating the content provider, or the like. Some content may be provided via a secure session (e.g., a Secure Socket Layer (SSL) session, a Secure Shell (SSH) session, a Transport Layer Security (TLS) session, a Hypertext Transfer Protocol Secure (HTTPS) session, etc.) between a device associated with the network user and a device associated with the content provider. However, the network operator may encounter difficulty in determining an appropriate party to bill for sponsored data usage via the secure session. For example, the secure session may prevent the network operator from identifying content that is accessed via the secure session and/or may prevent the network operator from tracking data usage with regard to sponsored content that is accessed via the secure session (e.g., based on data transmitted via the secure session being encrypted, etc.).

Implementations described herein enable one or more network devices to determine billing information for sponsored content that is transmitted via a secure session. The one or more network devices may generate a session time record that identifies the sponsored content, and that identifies a start time stamp and/or an end time stamp for the secure session. Based on the start time stamp and/or the end time stamp, the one or more network devices may obtain data usage information from a network processing unit that relays data associated with the secure session. The data usage information may identify an amount of data transmitted in association with the secure session. In this way, the one or more network devices can determine the amount of data transmitted via the secure session to provide the sponsored content, despite the data being transmitted via the secure session. Thereby, the one or more network devices improve network operations and permit billing of content providers for content provided via a secure session.

Figure 1A:
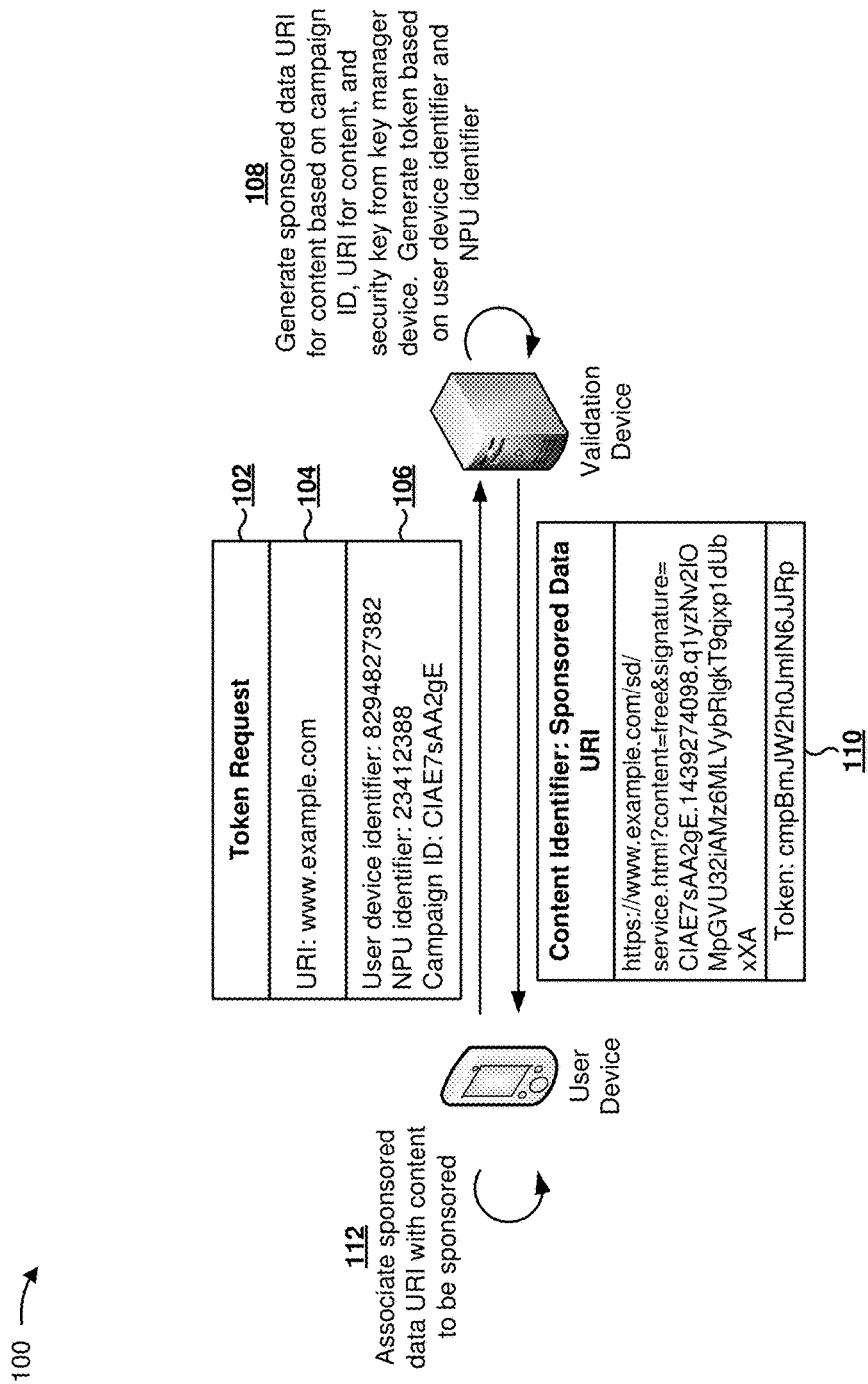
FIGS. 1A-1E are diagrams of an overview of an example implementation described herein.

FIGS. 1A-1E are diagrams of an overview of an example implementation 100 described herein. As shown in FIG. 1A, and by reference number 102, a user device may provide a token request to a validation device. The user device may provide the token request to cause the validation device to generate or obtain a content identifier and a token, for use by the user device to access a sponsored data campaign. The validation device may configure the sponsored data campaign to permit a content provider to subsidize data usage by the user device when the user device accesses content associated with the sponsored data campaign. As shown by reference number 104, the sponsored data campaign request may include a network address (e.g., a Uniform Resource Identifier (URI) of www.example.com) associated with the sponsored data campaign. A content provider may subsidize data usage by user devices that access content associated with the network address.

As shown by reference number 106, the sponsored data campaign request may include a user device identifier associated with the user device (e.g., a mobile directory number (MDN) of 8294827382) and a network processing unit (NPU) identifier associated with an NPU that provides data to and/or from the user device (e.g., 23412388). As further shown, the sponsored data campaign request may include a campaign identifier (e.g., CIAE7sAA2gE). The campaign identifier may identify a sponsored data campaign associated with the sponsored data campaign request, may identify the content provider, or the like. In some implementations, the campaign identifier may be generated by a content server device associated with the content provider. Additionally, or alternatively, the validation device may generate a campaign identifier for a particular campaign (e.g., based on receiving a sponsored data campaign request, etc.).

As shown by reference number 108, the validation device may generate a content identifier (e.g., a sponsored data URI) based on the network address associated with the sponsored data, the campaign identifier, and a security key obtained from a key manager device. The key manager device may generate, store, manage, and/or provide security keys for use by the validation device and/or other network devices to administer sponsored data services. In some implementations, the key manager device may store the security key in association with information identifying the sponsored data campaign (e.g., the campaign identifier, the sponsored data URI, etc.).

As further shown, the validation device may generate a token for the user device based on the user device identifier and the NPU identifier. For example, the validation device may encrypt the user device identifier and the NPU identifier, based on the security key, to generate the token. Here, the validation device generates a token of cmpBmJW2h0JmIN6JJRp.

As shown by reference number 110, the validation device may provide the sponsored data URI to the user device. As further shown, the sponsored data URI may include the campaign identifier of CIAE7sAA2gE, a time at which the sponsored data campaign expires (e.g., 1439274098), and a signature. The validation device may generate the signature based on the sponsored data campaign request and based on the security key. One or more network devices may perform operations related to billing, validation, or the like, based on the signature, as described in more detail elsewhere herein. As further shown, the validation device may provide the token to the user device. As shown by reference number 112, the user device may associate the sponsored data URI with the content to be sponsored. When the user device accesses the sponsored data URI, the content server device may provide the content to the user device, or may cause the content to be provided to the user device, as described in more detail below.

Figure 1B:
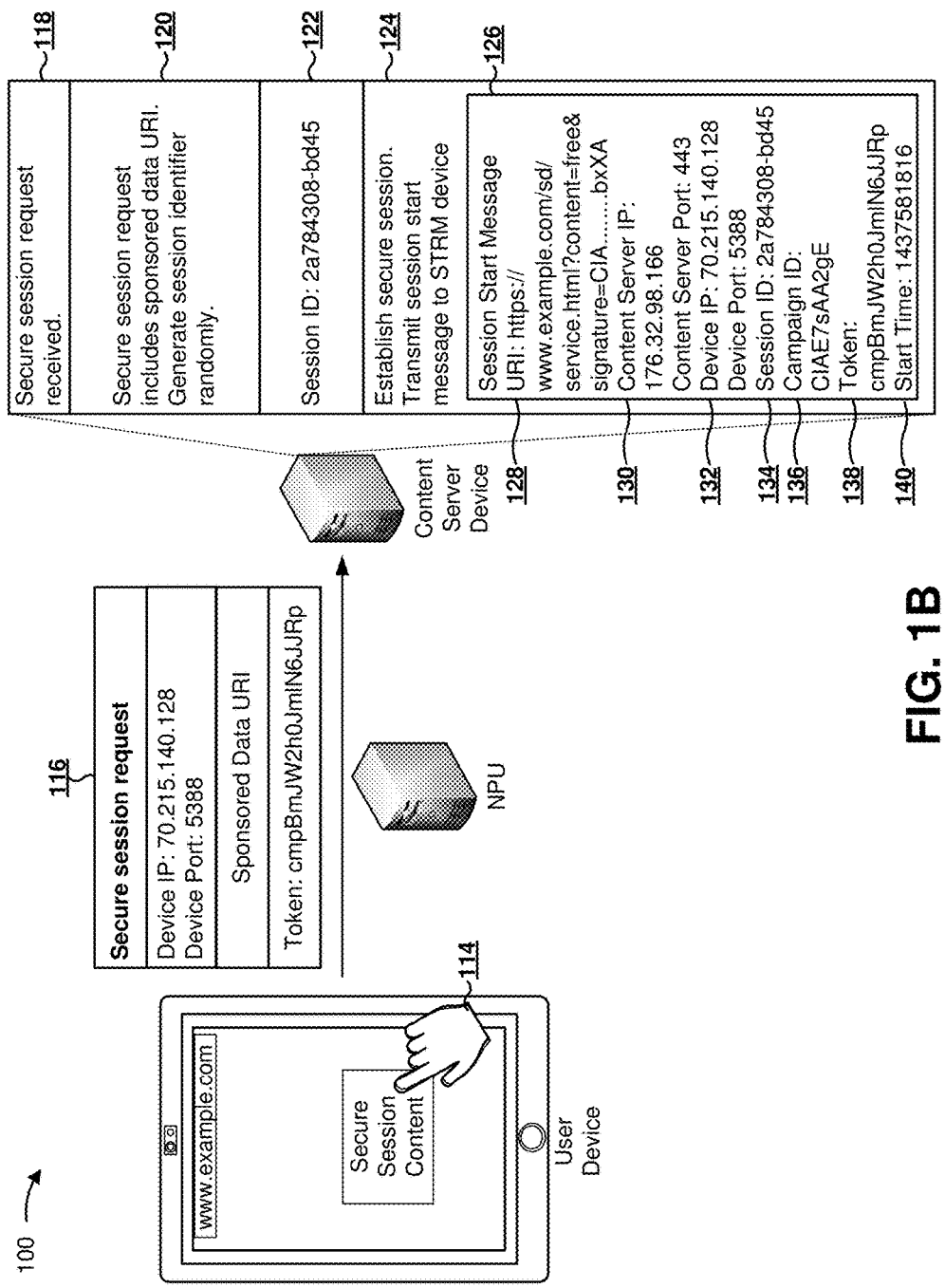

As shown in FIG. 1B, and by reference number 114, a user of the user device may attempt to access the content via a secure session. As shown by reference number 116, based on the user attempting to access the content, the user device may transmit a secure session request to the content server device via the NPU. As further shown, the secure session request may include a network address associated with the user device (e.g., an Internet Protocol (IP) address of 70.215.140.128 and a port of 5388), the token, and the sponsored data URI. In some implementations, the NPU may add the NPU identifier to the secure session request as the NPU relays the secure session request to the content server device. In some implementations, the user device may include the NPU identifier in the secure session request.

As shown by reference number 118, the content server device may receive the secure session request. As shown by reference number 120, the content server device may determine that the secure session request includes the sponsored data URI. In some implementations, the content server device may validate the sponsored data URI (e.g., to determine whether the sponsored data URI is valid and/or authentic, to determine whether the sponsored data URI originates from the user device, etc.), as described in more detail elsewhere herein. As further shown, the content server device may generate a session identifier (e.g., a random string of one or more characters). As shown by reference number 122, the session identifier may include a string of "2a784308-bd45."

As shown by reference number 124, the content server device may establish the secure session, and may transmit a session start message to a session time record manager (STRM) device based on establishing the secure session. As shown by reference number 126, the content server device may generate the session start message. As shown by reference number 128, the session start message may include the sponsored data URI. As shown by reference number 130, the session start message may identify a content server device network address (e.g., an IP address of 176.32.98.166 and a port of 443). As shown by reference number 132, the session start message may identify the network address associated with the user device.

As shown by reference number 134, the session start message may identify the session identifier of 2a784308-bd45. As shown by reference number 136, the session start message may identify the campaign identifier of CIAE7sAA2gE. As shown by reference number 138, the session start message may identify the token of cmpBmJW2h0JmIN6JJRp. As shown by reference number 140, the session start message may identify a start time stamp associated with the secure session (e.g., 1437581816).

Figure 1C:
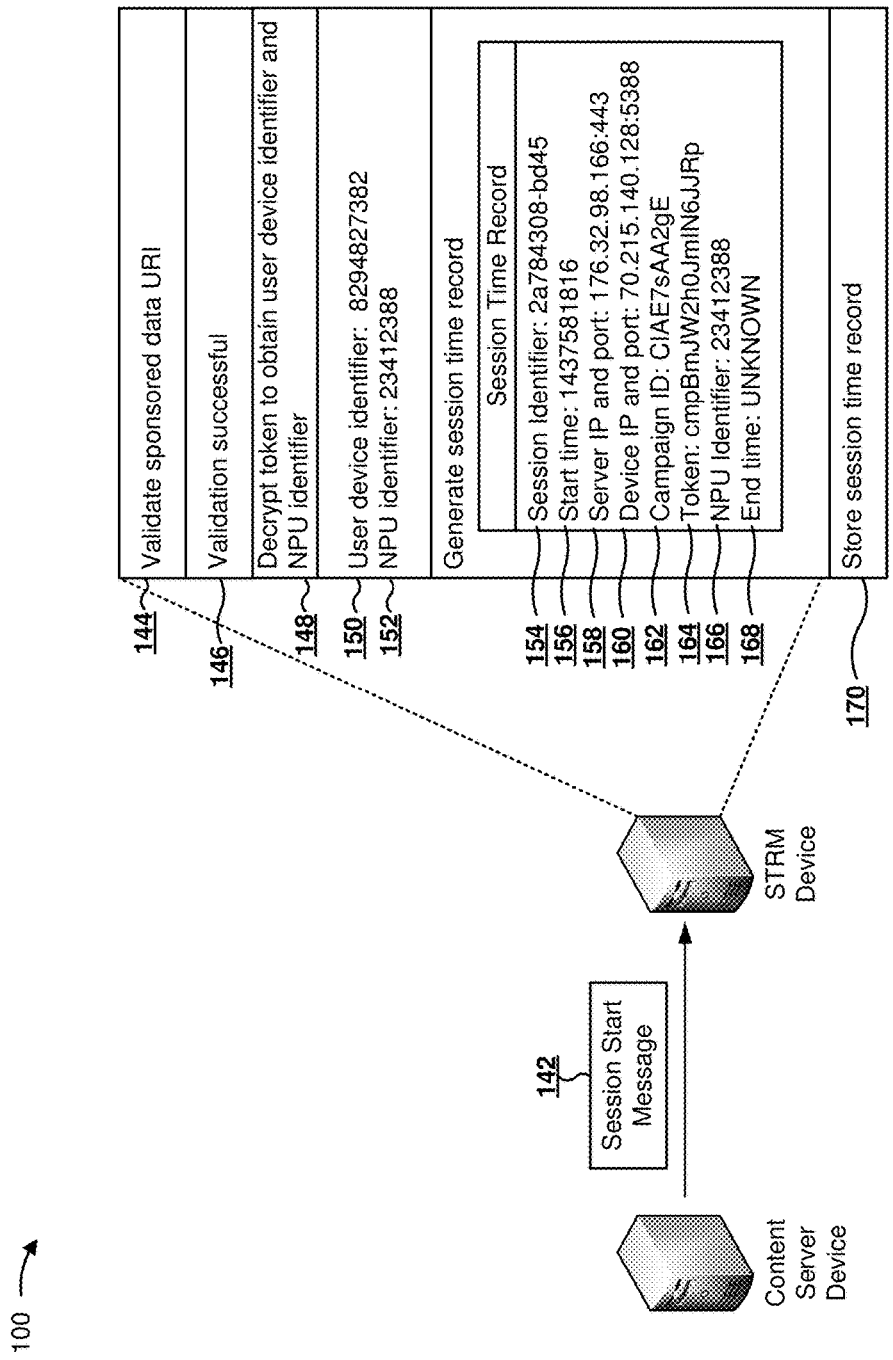

As shown in FIG. 1C, and by reference number 142, the content server device may provide the session start message to the STRM device. As shown by reference number 144, the STRM device may validate the sponsored data URI to the validation device for validation. For example, the STRM device may validate the sponsored data URI to ensure the validity of the sponsored data URI, to ensure the authenticity of the sponsored data URI, or the like. As shown by reference number 146, the STRM device may determine that the sponsored data URI is valid.

As shown by reference number 148, the STRM device may decrypt the token to obtain the user device identifier and the NPU identifier. For example, the STRM device may obtain the security key associated with the sponsored data campaign from the key manager device (e.g., based on the campaign identifier, based on the content server device network address, etc.), and may decrypt the token based on the security key to obtain the user device identifier and the NPU identifier. As shown by reference number 150, the STRM device may obtain the user device identifier of 8294827382.

As shown by reference number 152, the STRM device may obtain the NPU identifier of 23412388 based on decrypting the token. In some implementations, the STRM device may validate the session start message based on the user device identifier and/or the NPU identifier. For example, the STRM device may determine whether the session start message originates from the user device associated with the user device identifier, whether an NPU associated with the secure session matches the NPU identified by the NPU identifier, or the like.

As shown, the STRM device may generate a session time record based on the session start message. As shown by reference number 154, the session time record may identify the session identifier of 2a784308-bd45. As shown by reference number 156, the session time record may identify the start time stamp of 1437581816. As shown by reference number 158, the session time record may identify the network address associated with the content server device (e.g., the IP address of 176.32.98.166 and the port of 443). As shown by reference number 160, the session time record may identify the network address associated with the user device (e.g., the IP address of 70.215.140.128 and the port of 5388). As shown by reference number 162, the session time record may identify the campaign identifier of CIAE7sAA2gE. As shown by reference number 164, the session time record may identify the token of cmpBmJW2h0JmIN6JJRp. As shown by reference number 166, the session time record may identify the NPU identifier of 23412388. As shown by reference number 168, the session time record may not identify an end time stamp. The STRM device may subsequently include the end time stamp based on receiving a session end message, as described in more detail below. As shown by reference number 170, the STRM device may store the session time record.

Figure 1D:
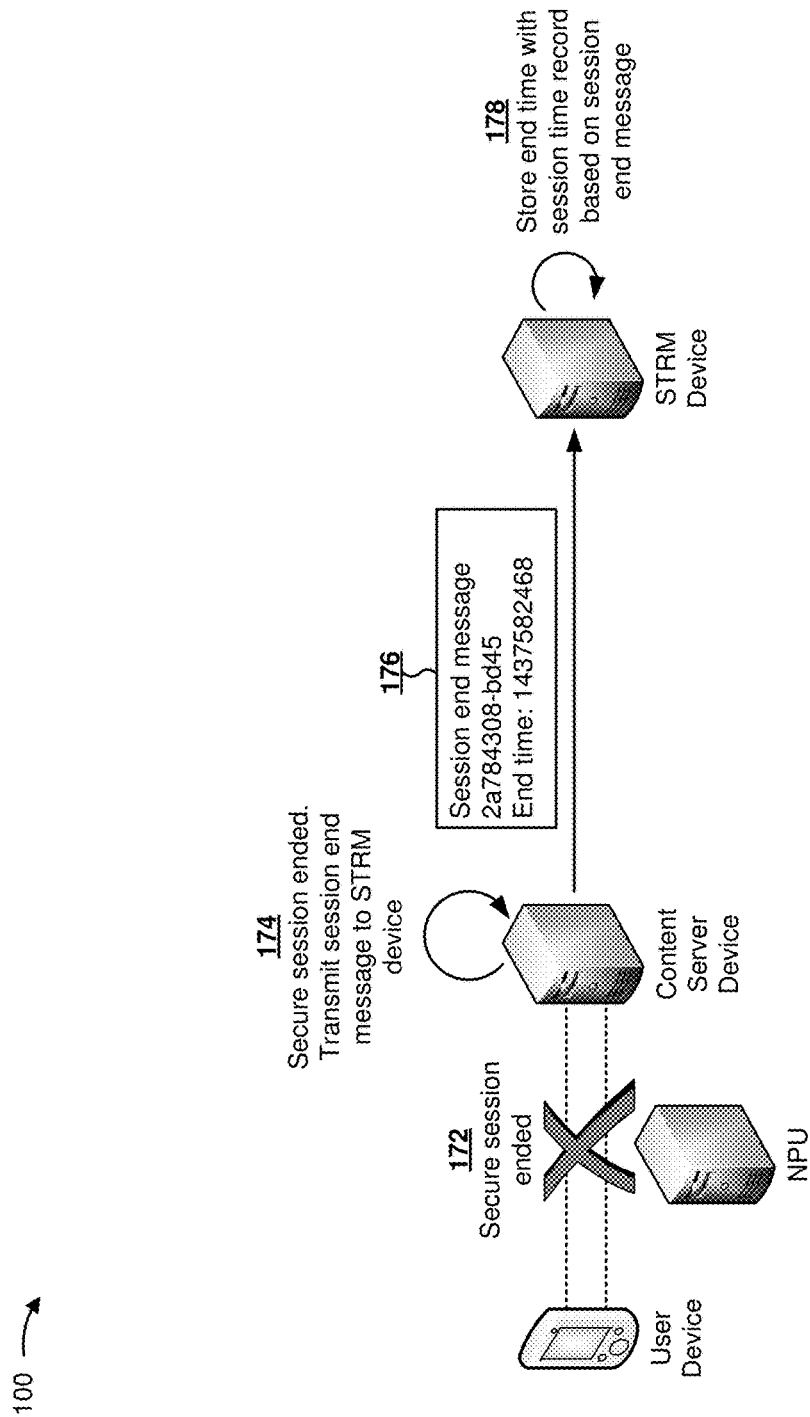

As shown in FIG. 1D, and by reference number 172, the content server device may end the secure session with the user device. As shown by reference number 174, based on ending the secure session, the content server device may transmit a session end message to the STRM device. As shown by reference number 176, the session end message may identify the session identifier of 2a784308-bd45, and may identify an end time stamp of the secure session (e.g., 1437582468). As shown by reference number 178, the STRM device may store information identifying the end time stamp with the session time record. For example, the STRM device may identify the session time record based on the session identifier, and may store the information identifying the end time stamp in association with the session time record.

Figure 1E:
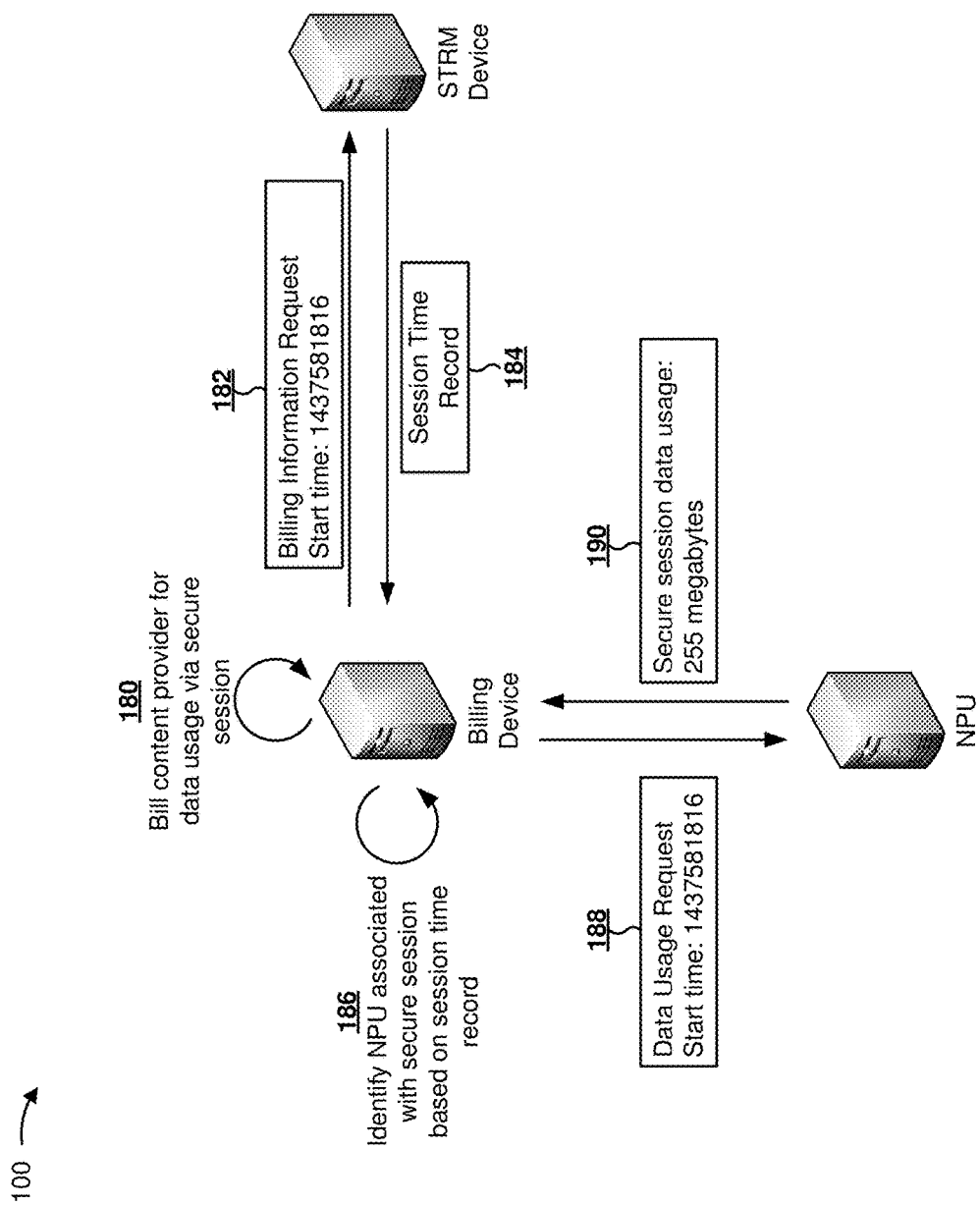

As shown in FIG. 1E, and by reference number 180, a billing device may determine to bill the content provider for data usage, associated with the sponsored content, via the secure session. For example, the billing device may receive a notification (e.g., from the STRM device, from the content server device, etc.) based on the content server device ending the secure session, and may determine to bill the content server device based on receiving the notification.

As shown by reference number 182, to obtain billing information, the billing device may provide information identifying the start time stamp of the secure session to the STRM device. For example, the billing device may provide the information identifying the start time stamp based on an application programming interface (API) associated with the STRM device. As shown by reference number 184, based on the billing information request, the STRM device may identify the session time record, and may provide the session time record to the billing device.

As shown by reference number 186, the billing device may identify the NPU associated with the secure session based on the session time record. As shown by reference number 188, the billing device may transmit, to the NPU associated with the secure session, a data usage request. As further shown, the data usage request may identify the start time stamp of 1437581816. As shown by reference number 190, based on the data usage request, the NPU may provide information identifying a quantity of data transmitted via the secure session (e.g., 255 megabytes). The billing device may bill the content provider for the data usage via the secure session.

In this way, the STRM device improves network security by permitting the content server device to provide sponsored content via a secure session, and facilitates billing of appropriate parties for sponsored data usage based on data usage measured at the NPU.

Figure 2:
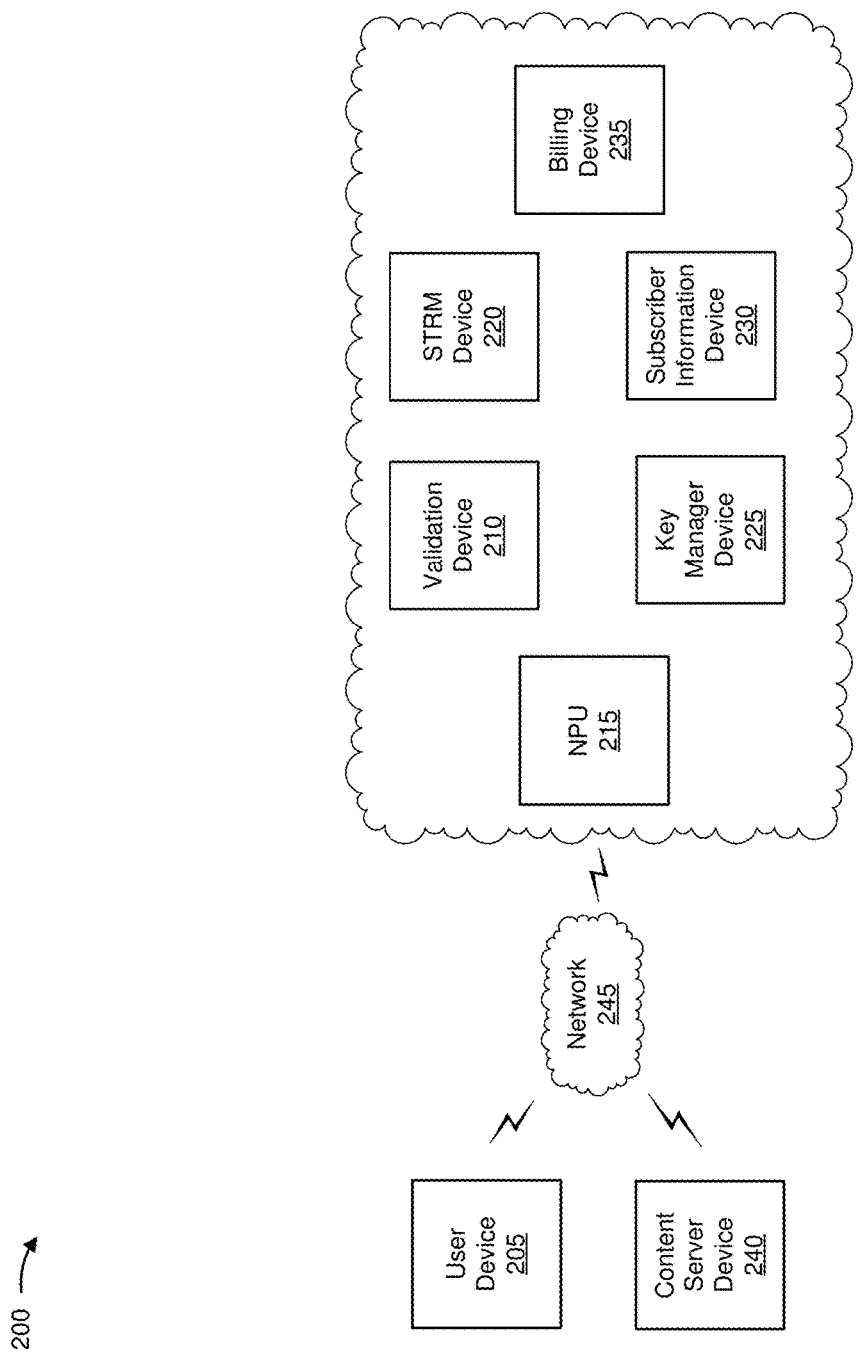
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 205, a validation device 210, a network processing unit (NPU) 215, a session time record manager (STRM) device 220, a key manager device 225, a subscriber information device 230, a billing device 235, a content server device 240, and a network 245. Devices of environment 200 may interconnect via wired connections, wireless connections, or a combination of wired and wireless connections.

User device 205 may include one or more devices capable of receiving, generating, storing, processing, and/or providing information. For example, user device 205 may include a communication and computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a set-top box, or a similar type of device. In some implementations, user device 205 may receive information from and/or transmit information to another device in environment 200.

Validation device 210 may include one or more devices capable of receiving, storing, processing, and/or providing information. For example, validation device 210 may include a computing device, such as a server device or a similar device. In some implementations, validation device 210 may receive information from and/or transmit information to another device in environment 200.

NPU 215 may include one or more devices capable of receiving, processing, storing, and/or transferring traffic associated with network 245. For example, NPU 215 may include a server, a gateway, a firewall, a router, or a similar device. In some implementations, NPU 215 may receive information from and/or transmit information to another device in environment 200.

STRM device 220 may include one or more devices capable of receiving, storing, generating, processing, and/or providing information. For example, STRM device 220 may include a computing device, such as a server device or a similar device. In some implementations, STRM device 220 may receive information from and/or transmit information to another device in environment 200.

Key manager device 225 may include one or more devices capable of generating, storing, processing, deleting, and/or providing a security key and/or information associated with a security key. For example, key manager device 225 may include a computing device, such as a server device or a similar device. In some implementations, key manager device 225 may receive information from and/or transmit information to another device in environment 200.

Subscriber information device 230 may include one or more devices, such as one or more server devices, capable of managing (e.g., receiving, generating, storing, processing, and/or providing) information associated with user device 205. For example, subscriber information device 230 may manage subscription information associated with user device 205, such as information that identifies a subscriber profile of a user associated with user device 205, information that identifies services and/or applications that are accessible to user device 205, location information associated with user device 205, a network identifier (e.g., a network address) that identifies user device 205, information that identifies a treatment of user device 205 (e.g., quality of service information, a quantity of minutes allowed per time period, a quantity of data consumption allowed per time period, etc.), and/or similar information. Subscriber information device 230 may provide this information to one or more other devices of environment 200 to support the operations performed by those devices.

Billing device 235 may include one or more devices capable of managing billing information and/or session time record information for a sponsored data service. For example, billing device 235 may include a computing device, such as a server device (e.g., a web server, a database server, etc.) or a similar device associated with a network operator (e.g., a network operator of network 245). In some implementations, billing device 235 may be capable of billing a content provider associated with content server device 240 and/or a user of user device 205 for activities related to a sponsored data service.

Content server device 240 may include one or more devices that provide content. For example, content server device 240 may include a website host (e.g., a device that provides one or more websites). In some implementations, content server device 240 may include a repository of content for inclusion in one or more webpages. For example, content server device 240 may store and/or provide an image file, an audio file, a video file, a script, an advertisement, or the like. In some implementations, content server device 240 may receive information from and/or transmit information to another device in environment 200.

Network 245 may include one or more wired and/or wireless networks. For example, network 245 may include a cellular network (e.g., a code division multiple access (CDMA) network, a long term evolution (LTE) network, etc.), a public land mobile network (PLMN), a local area network (LAN), a wide area network (WAN), a metropolitan area network (MAN), a telephone network (e.g., the Public Switched Telephone Network (PSTN)), a near field communication (NFC) network, an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
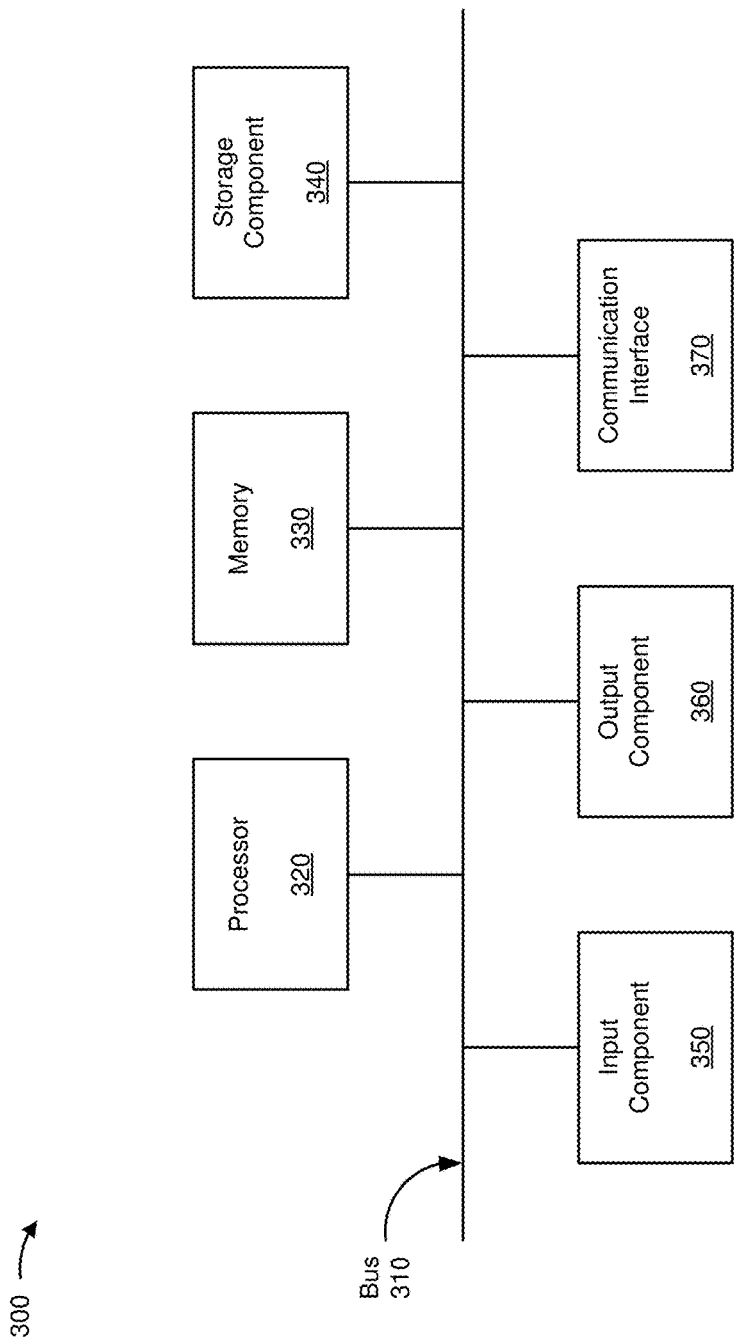
FIG. 3 is a diagram of example components of one or more devices of FIG. 2.

FIG. 3 is a diagram of example components of a device 300. Device 300 may correspond to user device 205, validation device 210, NPU 215, STRM device 220, key manager device 225, subscriber information device 230, billing device 235, and/or content server device 240. In some implementations, user device 205, validation device 210, NPU 215, STRM device 220, key manager device 225, subscriber information device 230, billing device 235, and/or content server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for generating a session time record relating to a secure session. In some implementations, one or more process blocks of FIG. 4 may be performed by STRM device 220. In some implementations, one or more process blocks of FIG. 4 may be performed by another device or a group of devices separate from or including STRM device 220, such as user device 205, validation device 210, NPU 215, key manager device 225, subscriber information device 230, billing device 235, and/or content server device 240.

As shown in FIG. 4, process 400 may include receiving a session start message that includes a content identifier, a token, a start time stamp, and/or a session identifier (block 410). For example, STRM device 220 may receive a session start message from content server device 240. STRM device 220 may receive the session start message based on content server device 240 establishing a secure session (e.g., a TLS session, an SSL session, an HTTPS session, etc.) with user device 205 to provide content to user device 205. The content may be associated with a sponsored data campaign, and a content provider associated with content server device 240 may be billed for data usage associated with the content and the secure session, as described in more detail elsewhere herein.

As an example, user device 205 may transmit a secure session request to content server device 240. The secure session request may identify user device 205 (e.g., based on a user device identifier, such as an international mobile subscriber identity (IMSI), an international mobile station equipment identity (IMEI), a mobile device number (MDN), a subscriber identifier that identifies a user associated with user device 205, etc.), may identify content to be accessed (e.g., based on a content identifier, such as a uniform resource locator (URL), a uniform resource identifier (URI), an Internet Protocol (IP) address, a network port, an email address, or the like, as described in more detail in connection with block 420, below), may identify NPU 215 (e.g., based on an NPU identifier, as described in more detail below), or the like. Based on receiving the secure session request from user device 205, content server device 240 may generate a session start message, and may transmit the session start message to STRM device 220.

In some implementations, the session start message may include a token. A token may include an encrypted string that may be generated based on a user device identifier associated with user device 205 (e.g., an MDN, an IMSI, an IMEI, a subscriber identifier, etc.) and/or an NPU identifier associated with NPU 215. The NPU identifier may include a string of one or more characters. STRM device 220, or another device (e.g., billing device 235, etc.), may use the NPU identifier to identify a source of the session start message. Validation device 210 may generate the token based on the user device identifier and the NPU identifier. For example, validation device 210 may receive the user device identifier and the NPU identifier in a token request from user device 205, and may generate and provide the token to user device 205 based on the token request.

In some implementations, validation device 210 may generate the token based on a security key. Validation device 210 may obtain the security key from key manager device 225. For example, key manager device 225 may store security keys that are associated with respective sponsored data campaigns. Validation device 210 may identify a sponsored data campaign that is associated with content to be provided via the secure session, and may obtain a security key associated with the sponsored data campaign (e.g., based on a campaign identifier associated with the sponsored data campaign, etc.). Validation device 210 may generate the token based on the user device identifier, the NPU identifier, and the security key. In this way, validation device 210 improves network security by preventing malicious parties from gaining access to a content of the token.

In some implementations, the session start message may include a start time stamp. The start time stamp may identify a time at which the secure session between content server device 240 and user device 205 (e.g., via NPU 215) is established. Based on the session start message, billing device 235 and/or another device can obtain a session time record pertaining to the secure session and/or data usage information associated with the secure session, as described in more detail below.

In some implementations, the session start message may include a session identifier. Content server device 240 may generate the session identifier based on establishing the secure session with user device 205. In some implementations, content server device 240 may generate the session identifier based on a random string of one or more characters. Additionally, or alternatively, content server device 240 may generate the session identifier based on information associated with the secure session (e.g., one or more network addresses, a start time stamp of the secure session, information identifying user device 205, NPU 215, and/or content server device 240, information identifying the sponsored data campaign, etc.). STRM device 220, billing device 235, and/or content server device 240 may identify a session time record based on the session identifier, which enables STRM device 220 and/or billing device 235 to bill the sponsored data campaign appropriately.

In some implementations, the session start message may include a network address associated with content server device 240 (e.g., an IP address, a network port, another type of network address, etc.), a network address associated with user device 205 (e.g., an IP address, a network port, another type of network address, etc.), information identifying a protocol associated with the secure session, or the like.

As further shown in FIG. 4, process 400 may include determining that the content identifier is valid (block 420). For example, STRM device 220 may determine that the content identifier is valid. In some implementations, STRM device 220 may perform an operation to determine that the content identifier is valid, as described in more detail below. Additionally, or alternatively, STRM device 220 may provide the content identifier and/or information associated with the content identifier to validation device 210, and validation device 210 may validate the content identifier, as described in more detail below. STRM device 220 may validate the content identifier to determine that the content identifier originates from user device 205 and/or content server device 240, to determine that the content identifier is authentic, to determine that the content identifier has not been subject to tampering, to determine that the content identifier has not been corrupted, to determine that the sponsored data campaign is active, or the like.

The content identifier may be associated with particular content, and may be associated with a sponsored data campaign. In some implementations, the content identifier may include a campaign identifier associated with the sponsored data campaign, may include information identifying an expiration time of the sponsored data campaign, or the like. Validation device 210, or another device, may generate the content identifier based on the particular content and/or based on the sponsored data campaign. For example, validation device 210 may receive a network address associated with the particular content (e.g., a URL, a URI, an IP address, an email address, etc.), and may generate a signature based on the network address and/or based on information associated with the sponsored data campaign.

In some implementations, validation device 210 may obtain a security key associated with the sponsored data campaign (e.g., from key manager device 225) and may generate the signature using the security key and based on the campaign identifier, the network address associated with the content, a network address associated with content server device 240, an expiration time associated with the sponsored data campaign, or the like. Validation device 210 may generate a content identifier based on the network address associated with the content and the signature (e.g., based on combining the network address associated with the content and the signature, etc.), and may provide the content identifier to content server device 240, for content server device 240 to associate with the content.

When a device (e.g., validation device 210, STRM device 220, content server device 240, etc.) receives the content identifier, the device may validate the content identifier based on the signature. For example, the device may obtain the security key (e.g., from key manager device 225, and based on the content identifier), and may generate a validation signature based on information included in the content identifier. The device may generate the validation signature based on the information associated with the sponsored data campaign (e.g., the same information used to generate the signature included in the content identifier).

The device may compare the validation signature to the signature included in the content identifier. When the validation signature matches the signature included in the content identifier, the device may determine that the content identifier is valid. In a situation where the content identifier is valid, the device may store and/or provide information indicating that the content identifier is valid, may cause a content provider associated with the sponsored data campaign to be billed for data usage associated with the content, or the like.

When the validation signature does not match the signature included in the content identifier, the device may determine that the content identifier is not valid. In a situation where the content identifier is not valid, the device may store and/or provide information indicating that the content identifier is not valid, may cause user device 205 to be billed for data usage associated with the content, or the like.

As further shown in FIG. 4, process 400 may include generating a session time record that includes the content identifier, the session identifier, the token, and/or the start time stamp (block 430). For example, based on the content identifier being valid, STRM device 220 may generate and/or store a session time record. The session time record may include the content identifier, the session identifier, the token, and/or the start time stamp. In some implementations, the session time record may include, for example, information identifying a network address and/or a user device identifier associated with user device 205, a network address associated with content server device 240, an NPU identifier associated with NPU 215, or the like.

In some implementations, STRM device 220 may store the session time record locally. Additionally, or alternatively, STRM device 220 may provide the session time record to another device for storage. For example, STRM device 220 may provide session time records to the other device periodically (e.g., every five minutes, every ten minutes, every hour, every day, every week, etc.), based on a storage capacity of STRM device 220 being filled, or the like. By providing session time records to the other device for storage, STRM device 220 conserves processor resources, storage resources, and network bandwidth associated with STRM device 220.

As further shown in FIG. 4, process 400 may include receiving a session end message that includes the session identifier and an end time stamp (block 440). For example, STRM device 220 may receive a session end message from content server device 240. STRM device 220 may receive the session end message based on content server device 240 ending a secure session with user device 205. For example, user device 205 and/or content server device 240 may end the secure session, and content server device 240 may transmit the session end message to STRM device 220 based on the secure session ending. In some implementations, the session end message may include, for example, the session identifier, an end time stamp, information identifying a network address associated with user device 205, information identifying a network address associated with content server device 240, information identifying a communication protocol associated with the secure session, information identifying a token, or the like.

In some implementations, NPU 215 may store data usage information associated with the secure session. For example, NPU 215 may store information identifying a start time stamp of the secure session, an end time stamp of the secure session, a network address associated with user device 205, a network address associated with content server device 240, and/or information identifying a quantity of data transmitted via NPU 215 in association with the secure session.

As further shown in FIG. 4, process 400 may include storing the end time stamp in association with the session time record (block 450). For example, STRM device 220 may store the end time stamp in association with the session time record. In some implementations, STRM device 220 may store the session time record locally. In that case, STRM device 220 may store the end time stamp in association with the session time record locally. Additionally, or alternatively, STRM device 220 may provide the session time record for storage by another device. In that case, STRM device 220 may provide the information identifying the end time stamp to the other device for storage in association with the session time record. In this way, STRM device 220 generates a session time record, which permits billing device 235 to bill sponsored data usage that occurs in association with a secure session.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for determining billing information based on a session time record. In some implementations, one or more process blocks of FIG. 5 may be performed by billing device 235. In some implementations, one or more process blocks of FIG. 5 may be performed by another device or a group of devices separate from or including billing device 235, such as user device 205, validation device 210, NPU 215, key manager device 225, subscriber information device 230, and/or content server device 240.

As shown in FIG. 5, process 500 may include obtaining a session time record to determine billing information for a secure session that is associated with a sponsored data service (block 510). For example, billing device 235 may obtain a session time record. Billing device 235 may obtain the session time record to determine billing information for a secure session that is associated with a sponsored data service. In some implementations, billing device 235 may obtain the session time record based on receiving a notification that a secure session associated with the sponsored data service has ended, based on determining that a content provider associated with the sponsored data service is to be billed, or the like.

In some implementations, billing device 235 may obtain the session time record from STRM device 220. In some implementations, billing device 235 may obtain the session time record based on a session identifier associated with the session time record, based on a start time stamp associated with the session time record, based on an end time stamp associated with the session time record, based on a campaign identifier associated with the session time record, based on a token associated with the session time record, or the like. For example, STRM device 220 may be associated with an API that permits billing device 235 to submit a query to obtain the session time record. Based on the query, STRM device 220 may obtain the session time record, and may provide the session time record to billing device 235.

As further shown in FIG. 5, process 500 may include obtaining data usage information for the secure session based on the session time record (block 520). For example, billing device 235 may obtain data usage information for the secure session based on the session time record. In some implementations, billing device 235 may obtain the data usage information from NPU 215. For example, the session time record may include an NPU identifier associated with NPU 215, and billing device 235 may obtain the data usage information from NPU 215 (e.g., based on NPU 215 storing the data usage information). Additionally, or alternatively, the data usage information may be included in the session time record. For example, when generating the session time record, STRM device 220 may obtain the data usage information from NPU 215, and may include the data usage information in the session time record.

As further shown in FIG. 5, process 500 may include determining the billing information based on the session time record and/or the data usage information (block 530). For example, billing device 235 may determine the billing information based on the session time record and/or the data usage information. Billing device 235 may determine the billing information based on a billing rate associated with a sponsored data campaign and/or based on the data usage information. For example, billing device 235 may obtain information identifying the billing rate (e.g., from subscriber information device 230), and may calculate a bill, for a content provider associated with content server device 240 and/or a user associated with user device 205, based on the billing rate.

In some cases, billing device 235 may determine to bill a content provider for data usage via the secure session. For example, in a situation where the content identifier is valid and where the sponsored data campaign is active, billing device 235 may determine to bill a content provider associated with the sponsored data campaign. Additionally, or alternatively, billing device 235 may determine to bill a user associated with user device 205 for data usage via the secure session. For example, in a situation where the content identifier is not valid and/or in a situation where the sponsored data campaign is inactive, is out of funding, or the like, billing device 235 may determine to bill a user associated with user device 205 for the data usage.

As further shown in FIG. 5, process 500 may include storing and/or providing the billing information (block 540). For example, billing device 235 may store and/or provide the billing information. In some implementations, billing device 235 may store the billing information locally. Additionally, or alternatively, billing device 235 may provide the billing information for storage (e.g., by user device 205, validation device 210, subscriber information device 230, content server device 240, etc.). Additionally, or alternatively, billing device 235 may bill a user of user device 205 and/or a content provider of content server device 240 based on the billing information. In some implementations, billing device 235 may bill the content provider for the full amount owed. In some implementations, billing device 235 may bill the user for the full amount owed. In some implementations, billing device 235 may bill the content provider for part of the amount owed, and may bill the user for part of the amount owed (e.g., the remaining amount).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In this way, a network operator may bill an appropriate party for a sponsored data service based on data usage via a secure session.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first device, comprising:
a memory; and
one or more processors to:
provide, to a second device, an information request, the information request including a time stamp, the time stamp identifying a time at which a secure session is established;

obtain, from the second device and based on the information request, a session time record that includes information relating to the secure session, the session time record including a content identifier and a network processing unit (NPU) identifier that is associated with a NPU,
the content identifier being associated with content to be provided via the secure session and via the NPU, and
the content being associated with a sponsored data campaign;
provide, to the NPU, a data usage request with the time stamp;
obtain, from the NPU, data usage information identifying an amount of data provided for the secure session based on the data usage request and the session time record,
the data being transmitted via the secure session to provide the content;
determine billing information based on the session time record and based on the data usage information;
determine, based on the content identifier, to bill a content provider associated with the sponsored data campaign; and
bill the content provider based on the billing information.

2. The first device of claim 1,
where the time stamp is a first time stamp, and
where the session time record identifies the first time stamp and a second time stamp associated with the secure session; and
where the one or more processors, when obtaining the data usage information, are to:
obtain the data usage information based on at least one of the first time stamp or the second time stamp.

3. The first device of claim 2,
where the second time stamp identifies a time at which the secure session is ended.

4. The first device of claim 1, where the one or more processors are further to:
determine the NPU identifier based on decrypting information included in the session time record.

5. The first device of claim 4, where the one or more processors are further to:
obtain a security key based on information identifying the sponsored data campaign,
the information identifying the sponsored data campaign being included in the session time record; and
where the one or more processors, when determining the NPU identifier, are to:
determine the NPU identifier based on decrypting the information included in the session time record,
the information included in the session time record being decrypted using the security key.

6. The first device of claim 1, where the one or more processors are further to:
determine whether to bill a party based on a result of validating the content identifier.

7. The first device of claim 6, where
the party is a user associated with a user device that accesses the content based on the content identifier.

8. A system, comprising:
one or more devices to:
receive a session start message that includes a session identifier, a token, a content identifier, and a first time stamp,
the session identifier being associated with a secure session via which sponsored content is to be provided,
the sponsored content being associated with a sponsored data campaign,
the content identifier being associated with the sponsored data campaign, and
the first time stamp identifying a time at which the secure session is established;
generate a validation signature based on information associated with the sponsored data campaign;
determine that the validation signature matches a signature included in the content identifier;
determine that the content identifier is valid based on determining that the validation signature matches the signature included in the content identifier;
decrypt the token based on a security key,
the security key being associated with the content identifier;
obtain a user device identifier and a network processing unit (NPU) identifier based on decrypting the token,
the user device identifier being associated with a user device, and
the NPU identifier being associated with a NPU that provides data to the user device;
generate a session time record based on the session start message and the first time stamp,
the session time record including the first time stamp, the content identifier, the NPU identifier, the user device identifier, and the session identifier,
the content identifier including a campaign identifier;
receive a session end message that includes the session identifier and a second time stamp,
the second time stamp identifying a time at which the secure session ends;
associate, with the session time record, the second time stamp;
determine data usage information that identifies an amount of data used to provide the sponsored content; and
provide the session time record and the data usage information for identification of a content provider associated with the sponsored data campaign based on determining that the content identifier is valid.

9. The system of claim 8, where the one or more devices includes a plurality of devices; and
where the session time record is generated and provided by a first device of the plurality of devices; and
where the data usage information is stored by a second device of the plurality of devices,
the second device being a different device than the first device.

10. The system of claim 9, where the amount of data is transmitted between a user device and the first device via the second device; and
where, when determining the data usage information, the second device is to:
determine the data usage information based on transmitting the amount of data.

11. The system of claim 9, where the session time record includes at least one of:
a network address associated with the second device,
a network address associated with a user device that is included in the secure session,
a protocol associated with the secure session, a device identifier that identifies the second device, or the user device identifier.

12. The system of claim 9, where the plurality of devices are further to:
receive the token,
the token being generated based on encrypting the user device identifier associated that is included in the secure session, and based on encrypting a device identifier associated with the second device; and
include, in the session time record, the user device identifier or the device identifier associated with the second device.

13. The system of claim 8, where the data usage information is stored in association with the first time stamp or the second time stamp; and
where the one or more devices, when determining the data usage information, are to:
determine the data usage information based on the first time stamp or the second time stamp.

14. The system of claim 8, where the one or more devices, when validating the content identifier, are to:
obtain a security key based on the content identifier,
the security key being associated with the sponsored data campaign; and
generate the validation signature using the security key.

15. A non-transitory computer-readable medium storing instructions, the instructions comprising:
one or more instructions that, when executed by one or more processors, cause the one or more processors to:
provide, to a first device an information request,
the information request including a time stamp,
the time stamp identifying a time at which a secure session is established;
obtain, from the first device and based on the information request, a session time record to determine billing information relating to a sponsored data campaign,
the session time record including a content identifier and a device identifier that is associated with a second device,
the content identifier being associated with sponsored content to be provided via the secure session and via the second device, and
the second device being different than the first device;
provide, to the second device, a data usage request with the time stamp;
obtain, from the second device, data usage information identifying an amount of data provided for the secure session based on the data usage request and the session time record,
the data being transmitted via the secure session to provide the sponsored content;
determine the billing information based on the session time record and based on the data usage information;
determine, based on the content identifier, to bill a content provider associated with the sponsored data campaign; and
bill the content provider based on the billing information.

16. The non-transitory computer-readable medium of claim 15, where the secure session includes at least one of:
a Transport Layer Security session,
a Secure Shell session,
a Secure Socket Layer session, or
a Hypertext Transfer Protocol Secure session.

17. The non-transitory computer-readable medium of claim 15, where the one or more instructions, that cause the one or more processors to obtain the session time record, cause the one or more processors to:
obtain the session time record based on an application programming interface associated with the first device.

18. The non-transitory computer-readable medium of claim 15,
where the time stamp is a first time stamp,
where the session time record includes the first time stamp and a second time stamp, and
the second time stamp identifying a time at which the secure session is ended; and
where the one or more instructions, that cause the one or more processors to obtain the data usage information, cause the one or more processors to:
obtain the data usage information based on providing information identifying the first time stamp or the second time stamp to the second device.

19. The non-transitory computer-readable medium of claim 15, where the one or more instructions, that cause the one or more processors to obtain the data usage information, cause the one or more processors to:
obtain the data usage information from a network processing unit that relays data associated with the secure session.

20. The system of claim 8, where the one or more devices are further to:
provide the session time record for storage by another device, and
provide information identifying the second time stamp to the other device for storage in association with the session time record.

* * * * *